United States Patent [19]
Garnault

[11] Patent Number: 5,929,769
[45] Date of Patent: *Jul. 27, 1999

[54] HANDS-FREE SYSTEM FOR UNLOCKING AND/OR OPENING AN OPENABLE MEMBER OF A MOTOR VEHICLE

[75] Inventor: Joël Garnault, Sannois, France

[73] Assignee: Valeo Securite Habitacle, Creteil, France

[ * ] Notice: This patent issued on a continued prosecution application filed under 37 CFR 1.53(d), and is subject to the twenty year patent term provisions of 35 U.S.C. 154(a)(2).

[21] Appl. No.: 08/738,265

[22] Filed: Oct. 25, 1996

[30] Foreign Application Priority Data

Oct. 26, 1995 [FR] France ................................. 95 12640
Jul. 22, 1996 [FR] France ................................. 96 09166

[51] Int. Cl.[6] ...................................................... H04Q 9/00
[52] U.S. Cl. ................................ 340/825.31; 340/825.31; 340/825.69; 340/825.32; 340/825.72; 340/825.44; 340/435; 340/426
[58] Field of Search ......................... 340/825.31, 825.69, 340/426, 825.32, 435, 825.72, 825.44

[56] References Cited

U.S. PATENT DOCUMENTS 4,354,189  10/1982  Lemelson ........................... 340/825.31
4,763,121  8/1988   Tomoda et al. ..................... 340/825.69
5,552,789  9/1996   Schuermann ....................... 340/825.31
5,635,923  6/1997   Steele et al. ...................... 340/825.32
5,675,490  10/1997  Bachhuber .............................. 340/426

FOREIGN PATENT DOCUMENTS

WO 90/08242  7/1990  WIPO .

OTHER PUBLICATIONS

"Keyless Entry System with Radio Card Transponder", I.E.E.E. Transactions on Industrial Electronics, vol. 35, No. 2, May 1988, pp. 208–216.

Primary Examiner—Brian Zimmerman
Assistant Examiner—Yves Dalencourt
Attorney, Agent, or Firm—McCormick, Paulding & Huber

[57] ABSTRACT

A system for unlocking and/or opening an openable member of a motor vehicle comprises a control unit, transmitter/receiver means connected to said control unit, and a transponder worn or carried by a user. The transmitter/receiver means of the vehicle comprise at least one antenna situated on the openable member or in the vicinity thereof, said transmitter/receiver means entering into dialogue with the transponder only when it is situated in the immediate vicinity of said antenna. The control unit causing the openable member to be unlocked and/or opened when the transponder is presented in a predetermined sequence to the antenna(s) of the transmitter/receiver means of the vehicle.

21 Claims, 2 Drawing Sheets

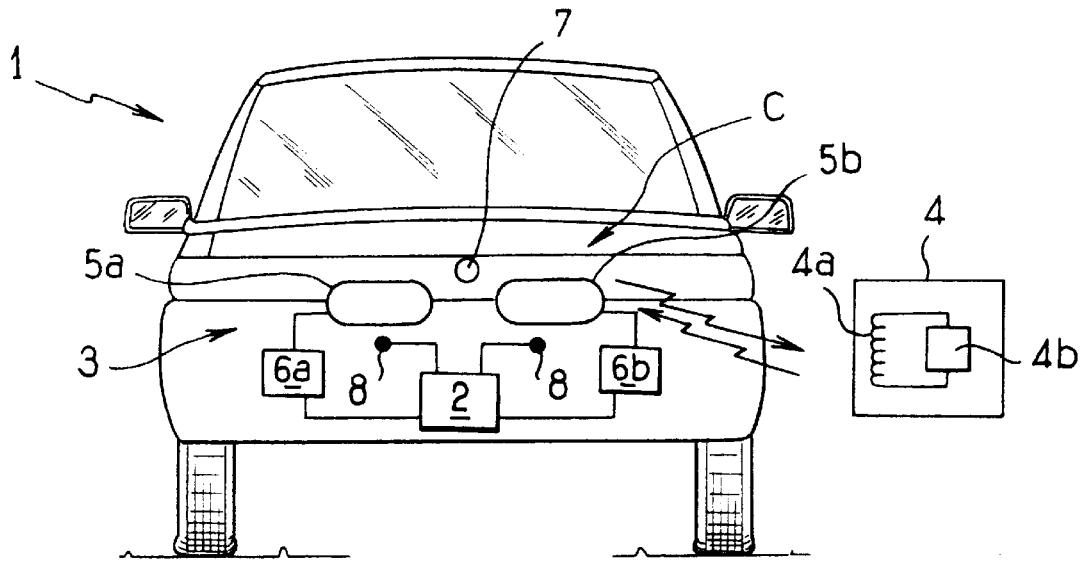
FIG_1
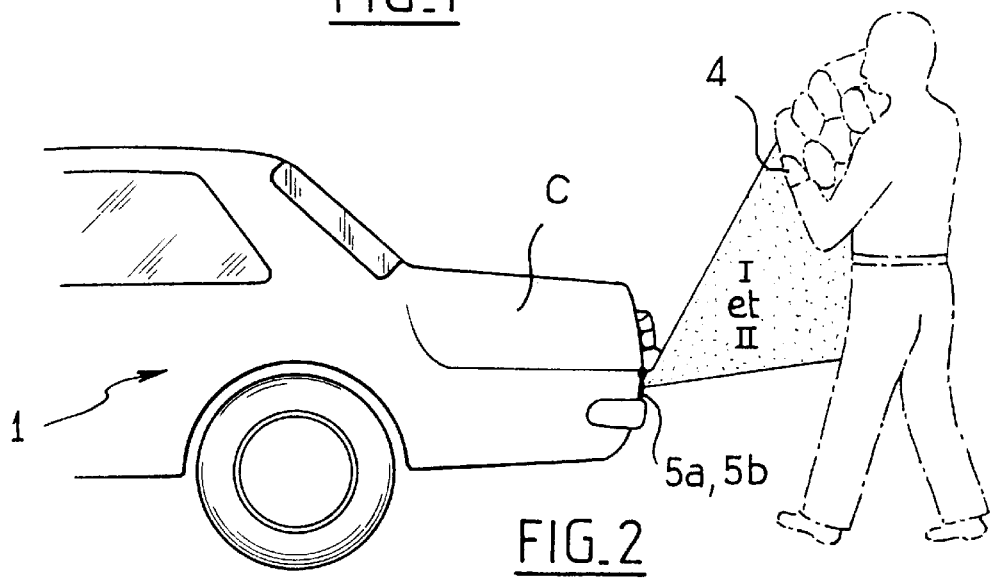
FIG_2
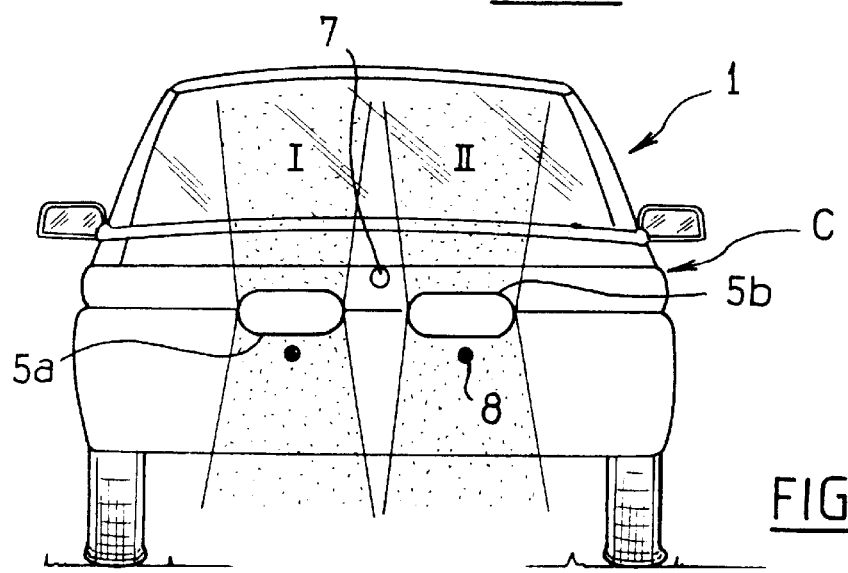
FIG_3

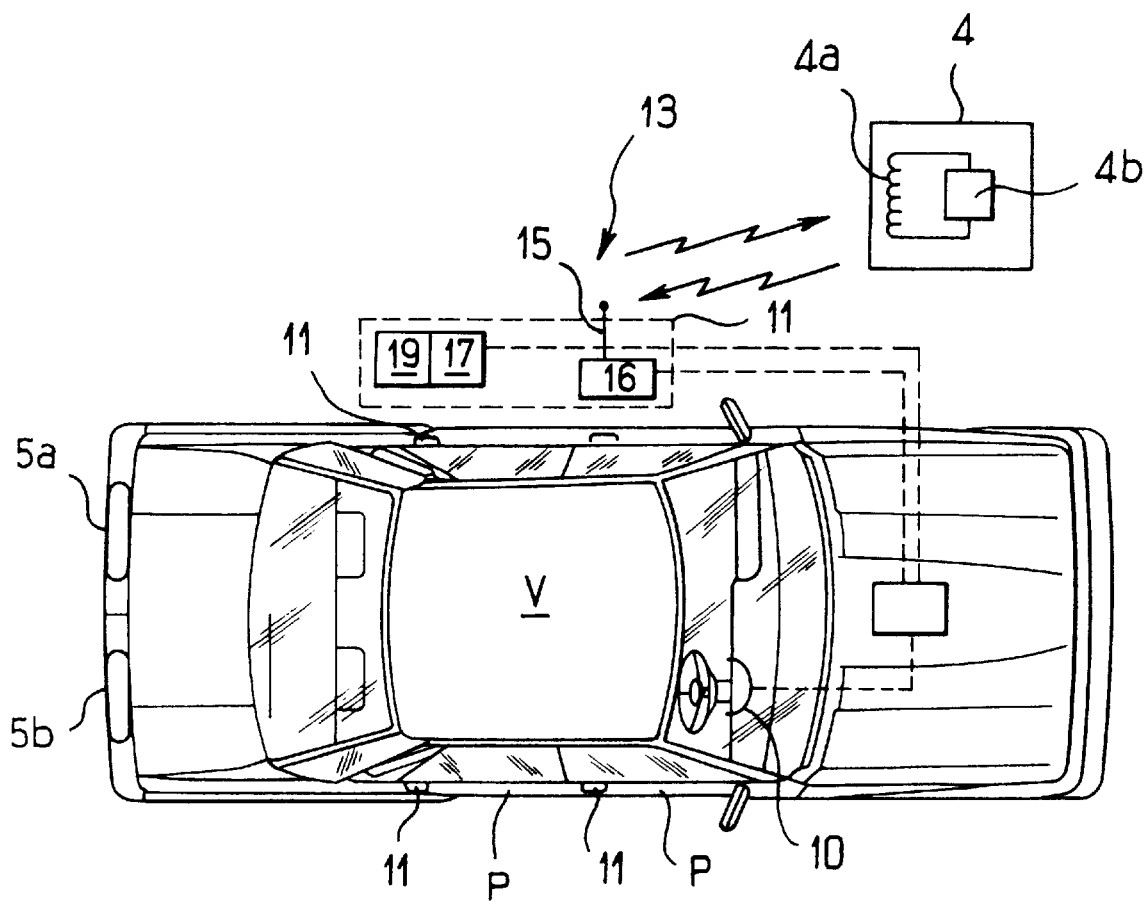
FIG_4

HANDS-FREE SYSTEM FOR UNLOCKING AND/OR OPENING AN OPENABLE MEMBER OF A MOTOR VEHICLE

The invention relates to systems for unlocking and/or opening openable members of motor vehicles, and in particular a trunk or boot for baggage.

BACKGROUND OF THE INVENTION

Systems already exist for giving assistance in opening or for automatically opening the trunk, which systems make use of manually-actuated remote controls. Such systems require at least one hand of the operator to be available, and that can be very inconvenient if the operator is carrying a load to be placed in the trunk.

OBJECTS AND SUMMARY OF THE INVENTION

The invention provides an unlocking and opening system that leaves the hands completely free.

To this end, the invention provides a system for unlocking and/or opening an openable member of a motor vehicle, the system comprising, on the vehicle, a control unit controlling means for unlocking and/or opening the openable member, and transmitter/receiver means connected to said control unit, said system also comprising transmitter/receiver means carried by a user and designed to transmit an identification code to the transmitter/receiver means of the vehicle to unlock and/or open the openable member, wherein the user's transmitter/receiver means are constituted by a transponder carried by the user, the transmitter/receiver means of the vehicle including at least one antenna situated on the openable member or in the vicinity thereof, said transmitter/receiver means entering into dialogue with the transponder only when the transponder is situated in the immediate vicinity of said antenna, the control unit controlling unlocking and/or opening of the openable member when the transponder is presented in a predetermined sequence to the antenna(s) of the transmitter/receiver means of the vehicle.

The term "transponder" is used here and throughout the present specification to mean a transmitter/reciever that has no independent power supply and that is remotely powered by the radiofrequency signals it receives coming from the unit with which it is in dialogue.

Such a locking system is particularly advantageous when used with a trunk, however it could naturally be used more generally for controlling the unlocking and/or opening of any other openable member of a motor vehicle.

BRIEF DESCRIPTION OF THE DRAWINGS

Other characteristics and advantages of the invention appear further from the following description. The description is purely illustrative and non-limiting. It should be read with reference to the accompanying drawings, in which:

FIG. 1 is a view of the back of a vehicle fitted with an unlocking and/or opening system constituting one possible embodiment of the invention, this back view being associated with a diagrammatic representation of a transponder for said system;

FIG. 2 is a diagrammatic side view of the back of the vehicle shown in FIG. 1;

FIG. 3 is a back view similar to that of FIG. 1, and showing the zones where an operator must place the transponder in succession in order to actuate unlocking and/or opening of the trunk; and FIG. 4 is a plan view of a motor vehicle in which locking and unlocking is controlled by a system constituting a possible embodiment of the invention.

MORE DETAILED DESCRIPTION

The vehicle illustrated in the figures is given reference 1, and its trunk is given reference C.

The system for unlocking and/or opening the trunk of the vehicle 1 comprises short-range transmitter/reciever means 3 for interrogating a transponder 4 carried by a user.

These means 3 include, in particular, at least two antennas 5a and 5b located at two different locations at the back of the vehicle.

By way of example, the antennas 5a and 5b may be spaced apart in a direction corresponding to the width of the trunk, in particular so as to be disposed on either side of the longitudinal axis of the vehicle, and they are separate from each other so as to implement two radiation pattern lobes with little or no overlap.

Depending on the configuration of the vehicle, they may be mounted on the openable member of the trunk, or they may be located in the immediate vicinity thereof, for example in the bumper of the vehicle, or they may be included in the immediate vicinity of the back lights of the car or inside said back lights.

The transmitter/reciever means 3 also include interface units 6a and 6b to which the antennas 5a and 5b are respectively connected, together with a control unit 2 disposed inside the vehicle and to which the interface units 6a and 6b are connected.

It is the control unit 2 that issues instructions to the trunk lock of the vehicle to unlock it and open it. Control of unlocking and opening the trunk C by means of said unit 2 is described in detail below.

The transponder 4 is a transmitter/reciever unit designed to transmit an identification code on receiving an interrogation sequence transmitted from the vehicle 1 by the transmitter means 3.

Its range is relatively short (a few tens of centimeters).

In conventional manner, it mainly comprises a secondary winding 4a which charges and discharges under the effect of radiofrequency radiation transmitted by a primary winding included in the transmitter means 3, together with an integrated circuit 4b in which the identification code of the user is stored and controlled.

The transponder 4 may be housed, for example, in a jewelry type article, such as a bracelet, a watch strap, a ring, a cuff link, etc. It may also be carried by the user in a pocket, on a belt, or at the end of a garment sleeve.

Means 7 are also provided at the trunk C or in the vicinity thereof for detecting the presence of the user in the vicinity of the openable member of said trunk.

These means 7 are connected to the control unit 2 and the control unit triggers interrogation of the transponder 4 by the transmitter/reciever means 3 when the presence of the user is detected by the means 7.

The means 7 may be constituted, for example, by one or more ultrasound sensors.

To unlock and open the trunk C of the vehicle 1, the operator must present the transponder 4 successively to each of the two antennas 5a and 5b in a specific sequence.

This sequence is chosen so that unlocking and opening cannot be triggered by ordinary unintentional movements of a person carrying the transponder 4, and in particular in the event of passing behind the vehicle without the intention of opening its trunk.

The trunk C of the vehicle 1 is advantageously fitted with display means 8, e.g. two-color lamps disposed close to the antennas 5a and 5b. These means 8 are intended to help the carrier of the transponder in performing the necessary actions for hands-free opening, and also to indicate that the trunk C has indeed been unlocked and then give warning of its automatic opening.

An example of a control sequence is described below with reference to FIGS. 2 and 3, for the case where the operator is wearing the transponder 4 on the wrist.

The operator, who may have his/her arms full, places the transponder-carrying arm 4 behind the trunk C so as to be offset by 5 cm to 30 cm to the right or the left relative to the center of said trunk C.

The presence sensor 7 then detects the transponder and triggers a sequence of interrogations via each of the two antennas 5a and 5b situated on either side of the central axis of the trunk.

If the operator is properly positioned, i.e. if the transponder 4 is situated in one of two zones I or II as shown in FIG. 3, in which zone it is capable of dialoguing with the antenna 5a or 5b, then one of said antennas 5a and 5b and only one of them receives the response signal transmitted by the transponder 4.

The code of said transponder 4 is recognized by the control unit 2 which controls the display means 8 to inform the operator that the code has been recognized by the antenna in front of which the transponder is located.

For example the unit 2 switches on a green light situated in the vicinity of said antenna.

On seeing this light turn on, the operator moves the transponder to the other side of the trunk C so that it is positioned in front of the second antenna 5a, 5b within a predetermined length of time (e.g. 1 second to 5 seconds), thereby enabling the code to be identified by the other antenna.

The light associated with the first antenna goes out since the code is no longer being received thereby because the transponder 4 has been moved away.

The light situated in the vicinity of the second antenna turns on to indicate that the signal of the transponder 4 has been detected by the second antenna and that its code has been recognized.

The operator then has the same period of time (1 second to 5 seconds) to position the transponder 4 back in communication with the first antenna.

When the code of the transponder 4 has again been recognized by the first antenna, both of the green lights of the means 8 are switched on simultaneously or they are caused to flash together to inform the operator that the procedure requesting opening of the trunk has succeeded.

Thereafter, the unit 2 controls other lights of the display means to warn the operator that the trunk is about to open (e.g. by flashing or by switching on simultaneously two red lights).

Naturally, if the vehicle trunk was already unlocked, the control unit 2 controls only the opening of the trunk.

The back and forth sequence that the operator must perform relative to the antennas serves to prevent mere passage of the operator past the trunk of the vehicle triggering unlocking and opening of said trunk in untimely manner.

If for any reason, the sequence of actions performed by the operator should be interrupted (code not recognized by only one antenna at a time, non-compliance with the distance and time ranges applicable to each position, . . . ) the procedure must be started again from the beginning.

The time and distance ranges are optimized to guarantee firstly that the procedure is simple to perform without ambiguity, and secondly that they can be performed easily by an operator whose movements are constricted.

The vehicle trunk may also include means enabling manual triggering, e.g. a pushbutton situated close to one of the antennas, which when actuated in association with correct recognition of the code of the transponder 4 causes the trunk to be unlocked and then automatically opened, with the possibility of warning the user by the above-described display means that the code has been recognized and then that the trunk is about to open. This function makes it possible to avoid performing the above sequence of movements when completely hands-free opening is not necessary or not desired by the user.

The above description relates to one possible sequence of movements when the transponder 4 is worn on the user's arm. When the transponder is carried on some other part of the body (in a pocket, on a belt, . . . ), other types of sequence could naturally be envisaged.

Also, as shown in FIG. 4, the transponder 4 carried by the user may also be used to control locking and unlocking of the doors, referenced P, of the vehicle.

To this end, the doors are likewise provided with short-range transmitter/reciever means 13 analogous to the means 3 and designed to interrogate the transponder 4 when it is in the immediate proximity of the handles of the doors P, which handles are referenced 11 in FIG. 4.

By way of example, these means 13 comprise a transmitter/receiver antenna 15 together with an interface 16 connected to the control unit 2.

Means 17 are provided on the vehicle for detecting the hand of the user when it approaches the handle 11 or when it actuates it.

These means 17 are connected to the control unit 2. This triggers interrogation of the transponder 14 by the transmitter/reciever means 13 whenever the presence of the user's hand at the handle 11 is detected.

By way of example, the means 17 may be constituted by a contact that serves to detect movement of the handle 11.

In another variant, the means may be constituted by infrared type sensors for sensing the presence of the hand or by a pressure-sensitive plate situated on the handle 11.

Thus, a user carrying such a transponder 4 in the hand or wearing it on the wrist causes the door P to be unlocked without performing any action other than moving the handle 11 to open the door.

When the physical presence of the user's hand is detected by the means 17, the transmitter/reciever means 13 interrogate the transponder 4. After the control unit 2 has recognized the identification code carried by the transponder 4, it causes the means for locking the door P to unlock the door.

Advantageously, the door P is unlocked sufficiently quickly to avoid hindering the movement applied to the handle 11 which serves initially to activate the means 17, so that continued movement then serves to release the mechanical locking means of the door.

To lock the door P, means 19 are provided that enable pressure on the handle 11 to be detected. These means 19 are likewise connected to the control unit 2.

On closing the door P, the user presses against the handle 11. When user hand pressure on the handle 11 is detected by the means 19, the unit 2 triggers locking of the door P once the door is reclosed.

It will readily be understood that compared with conventional systems using a mechanical key or a remote control, such a system provides the user with greater comfort and considerable saving in time, particularly on trips having frequent stops, since the action is completely transparent for the user. In particular the user does not have to look for the mechanical key or the remote control in a pocket or a handbag before opening the vehicle.

The integrated circuit 4b of the transponder 4 can store other personalized information relating to the user, e.g. information concerning adjustment and positioning of the seat, of the steering wheel, of the rearview mirrors, etc.

This information is transmitted together with the identification code during interrogation of the transponder 4 by the transmitter/reciever means 13.

The various elements of the vehicle concerned by said information are then actuated, for example, simultaneously with the locking/unlocking action of the doors.

It may also be observed that the system proposed by the invention enables the control unit 2 to locate which door P is being used by the user.

This information can be used by the unit 2 to control the adjustment of the various above-mentioned elements (seats, rearview mirrors, etc.) in localized manner: only the seat corresponding to the door P used by the user will be adjusted; equally, the rearview mirrors or the position of the steering wheel will be adjusted only if the user is using the driver's door; provision can also be made to unlock only that door which the user is attempting to use, with the other doors remaining locked.

The transponder 4 may also advantageously be used for deactivating a device for immobilizing the engine.

Since the system of the invention makes it possible to do away completely with mechanical keys, the driver makes contact and starts the vehicle by turning a multiposition starter switch, e.g. situated beneath the steering wheel.

The transponder 4 is interrogated, for example, whenever movement of said starter switch is detected. The code delivered by the transponder 4 is transmitted to the control unit of the engine immobilizing device.

This control unit is advantageously the control unit 2 connected to the interface units 6a, 6b, and 16.

In a variant, provision may be made for the starter switch to be normally locked in position and only recognition of the proper identification code allows it to be moved.

In another variant, a clutch system may be provided preventing the switch from engaging until the identification code has been received.

It will be observed that a driver does not usually use the same hand for actuating the door handle of the car and for making contact and starting: for cars that drive on the right, the door is opened with the left hand while contact is made with the right hand.

To enable interrogation to be performed independently of the hand carrying or wearing the transponder 4, the transmitter/receiver means inside the motor vehicle cabin advantageously include a loop antenna 10 surrounding the instrument zone of the dashboard or situated around the steering wheel. In another variant, the antenna may be situated in the switch block beneath the steering wheel.

These various antenna dispositions make it possible to interrogate a transponder 4 located near the user's left hand while said hand is beneath the steering wheel for making contact. They also enable the transponder 4 to be continuously interrogated while the driver has that hand on the steering wheel, in order to verify that said transponder 4 is still present on the wrist of the driver while driving.

To this end, the control unit 2 regularly interrogates said transponder 4. It interprets an absence of response during a short period of time as an ordinary movement performed by the driver and it makes no mention of the fact. However, prolonged absence is indicated to the driver by a light on the dashboard or by an audible signal so that the driver is immediately warned if the transponder 4 is no longer in place on the wrist or in the hand.

It will be understood that such a system is transparent: a user controls unlocking of the doors without needing to perform operations other than handling the door handle.

In addition, with such a system, the risk of the user becoming separated from the transponder after entering the vehicle is small. The transponder is either worn as a jewelry type element, such as a bracelet, which the user has no reason to remove while driving, or else it is housed at one end of a garment sleeve which the user normally wears all the time.

In addition, such a system uses simple electronics. It requires transmission and reception antennas only at the door handles. In addition radiofrequency transmissions are localized and short in range, thereby avoiding any risk of interference, and also any risk of conflict between users.

The local nature of the interchanges also reduces any risk of piracy.

Since the transponder does not have a battery, it will be understood that it is easily miniaturized.

In addition, with the system proposed by the invention, the mere presence of the wearer of the transponder in the vehicle environment does not suffice to unlock the doors. It is necessary for the hand of the user to be moved so as to come into the immediate vicinity of the door handle.

Insofar as use retains an active role to be played by the user during an unlocking operation, such a system avoids untimely unlocking authorizations which are a major drawback with interactive systems.

I claim:

1. A system for unlocking and/or opening an openable member of a motor vehicle, the system comprising, on the vehicle, a control unit controlling means for unlocking and/or opening the openable member, and transmitter/receiver means connected to said control unit, said system also comprising transmitter/receiver means carried by a user and designed to transmit an identification code to the transmitter/receiver means of the vehicle to unlock and/or open the openable member, wherein the user's transmitter/receiver means are constituted by a transponder carried by the user, the transmitter/receiver or means of the vehicle including at least one antenna situated on the openable member or in the vicinity thereof, said transmitter/receiver means of the vehicle entering into dialogue with the transponder for transmitting the identification code from the transponder to the transmitter/receiver means of the vehicle only when the transponder is situated in the immediate vicinity of said antenna, the control unit comprising means to detect the presentation of the transponder according to a predetermined sequence to said at least one antenna of the transmitter/receiver means of the vehicle in addition to the transmission of the identification code when the transponder is situated in the immediate vicinity of the antenna and controlling unlocking and/or opening of the openable member when said predetermined sequence is detected.

2. A system according to claim 1, wherein the transmitter/receiver means of the vehicle include at least two antennas to which the transponder needs to be presented in a predetermined sequence in order to cause the control unit to unlock and/or open the openable member.

3. A system according to claim 2, wherein the antennas are spaced apart in a direction corresponding to the width of the openable member.

4. A system according to claim 1, including means for detecting the presence of a user in the vicinity of the openable member.

5. A system according to claim 4, wherein the means for detecting the presence of a user include at least one ultrasound sensor.

6. A system according to claim 1, including display means in the vicinity of an antenna enabling the user to be warned that the identification code of a transponder presented to said antenna has been recognized or not recognized and/or to inform the user that the procedure for recognizing the transponder presentation sequence to the antenna(s) has succeeded and/or that the member is about to open.

7. A system according to claim 1, also including means enabling manual triggering, the control unit causing the openable member to be unlocked and/or opened when said manual triggering means are actuated and the identification code of the transponder has been recognized, after the transponder has been presented to an antenna.

8. A system for unlocking and/or opening an openable member of a motor vehicle trunk, wherein it is constituted by a system according to claim 1.

9. A system according to claim 8, wherein the antennas are disposed at the vehicle bumper.

10. A system according to claim 8, wherein the antennas are disposed in the immediate vicinity of the vehicle back lights.

11. A system according to claim 8, wherein the antennas are disposed in the vehicle back lights.

12. A system for locking and unlocking the trunk and the doors of a motor vehicle without using a mechanical key, the system comprising a system according to claim 8 for unlocking and/or opening the trunk, and further comprising transmitter/receiver means comprising an antenna situated in the immediate vicinity of the handle of a door, said means being designed to enter into dialogue with the transponder to identify the identification code thereof, said means entering into dialogue with said transponder only when it is situated in the immediate vicinity of the handle.

13. A system according to claim 12, wherein the vehicle doors are not provided with mechanical key locks.

14. A system according to claim 12, wherein the handle includes means for detecting that the hand of the user is in the immediate vicinity of the handle or is actuating it, the control unit causing the transponder to be interrogated when the above-specified detection means detect the presence of the hand of the user at said handle.

15. A system according to claim 12, including means for detecting pressure of the user's hand on the handle, the control unit causing the door to be locked when the door is closed and the above-specified detection means detect door-closing pressure from the hand of the user on said handle.

16. A system according to claim 1, also including transmitter/receiver means disposed inside the vehicle cabin and connected to a control unit, said means being designed to interrogate the transponder when the user enters the vehicle, said control unit causing the device for preventing the engine being used to be deactivated when the identification code of the transponder is identified.

17. A system according to claim 16, wherein the control unit which deactivates an engine-immobilizing device and the previously-mentioned control unit are the same.

18. A system according to claim 16, wherein the transmitter/receiver means disposed inside the vehicle cabin regularly interrogate the transponder when the user is inside the vehicle.

19. A system according to claim 1, wherein the transponder transmits to the control unit together with its identification code, information for adjusting the personality of certain elements of the vehicle.

20. A system according to claim 19, wherein the control unit controls the adjustment of said various elements in localized manner, depending on the door being used by the user.

21. A motor vehicle, including for its trunk, an unlocking and/or opening system according to claim 1.

* * * * *